(12) United States Patent
Schäfer et al.

(10) Patent No.: US 9,089,948 B2
(45) Date of Patent: Jul. 28, 2015

(54) POLISHING TOOL FOR FINISHING OPTICALLY EFFECTIVE SURFACES ON SPECTACLE LENSES IN PARTICULAR

(75) Inventors: Holger Schäfer, Weilmünster (DE); Steffen Wallendorf, Wetzlar-Dutenhofen (DE)

(73) Assignee: Satisloh AG, Baar (CH)

( * ) Notice: Subject to any disclaimer, the term of this patent is extended or adjusted under 35 U.S.C. 154(b) by 721 days.

(21) Appl. No.: 13/389,167

(22) PCT Filed: Aug. 11, 2010

(86) PCT No.: PCT/EP2010/004898
§ 371 (c)(1),
(2), (4) Date: Feb. 6, 2012

(87) PCT Pub. No.: WO2011/018212
PCT Pub. Date: Feb. 17, 2011

(65) Prior Publication Data
US 2012/0135672 A1    May 31, 2012

(30) Foreign Application Priority Data
Aug. 12, 2009 (DE) .......................... 10 2009 036 981

(51) Int. Cl.
*B24B 13/01* (2006.01)
*B24B 41/06* (2012.01)
(Continued)

(52) U.S. Cl.
CPC ............... *B24B 41/066* (2013.01); *B24B 13/02* (2013.01); *B24D 13/147* (2013.01)

(58) Field of Classification Search
CPC .................. B24B 13/01; B24B 13/012; B24B 13/02–13/026; B24B 41/066
USPC ...................... 451/41–44, 514–516, 906, 921
See application file for complete search history.

(56) References Cited

U.S. PATENT DOCUMENTS 4,671,915 A * 6/1987 Fujimoto et al. ............... 264/162
5,226,682 A * 7/1993 Marrison et al. .............. 285/308
(Continued)

FOREIGN PATENT DOCUMENTS

| DE | 101 06 659 A1 | 8/2002 |
| DE | 10 2004 062 319 B3 | 3/2006 |
| GB | 2 380 699 A | 4/2003 |

OTHER PUBLICATIONS

PCT International Preliminary Report on Patentability, International Application No. PCT/EP2010/004898, Filing Date—Aug. 11, 2010, Date of Issuance—Mar. 13, 2012, 7 pgs.
(Continued)

*Primary Examiner* — Monica Carter
*Assistant Examiner* — Marcel Dion
(74) *Attorney, Agent, or Firm* — Reising Ethington P.C.

(57) ABSTRACT

The proposed polishing tool has a base body with an open interior space with which the polishing tool can be slidably fitted onto a holder of a tool spindle, initially as far as a latching position. A retaining ring placed in an annular groove of the interior space engages in a counter-groove of the holder. The polishing tool can then be slid further onto the holder under the polishing work pressure, until, under the simultaneous action of torque, driver elements of the base body engage in driver counter-elements of the holder for transmitting rotary movement. At least in the latter relative position between the polishing tool and tool spindle, the retaining ring provides a seal against penetration of the abrasive polishing agent.

23 Claims, 5 Drawing Sheets

(51) Int. Cl.
  *B24B 13/02* (2006.01)
  *B24D 13/14* (2006.01)

(56) References Cited

U.S. PATENT DOCUMENTS

| | | | |
|---|---|---|---|
| 5,421,770 A | 6/1995 | Bobst | |
| 5,639,273 A * | 6/1997 | Sjolander et al. | 451/450 |
| 5,695,393 A | 12/1997 | Granziera | |
| 5,816,625 A * | 10/1998 | Clarke | 285/305 |
| 6,371,837 B1 * | 4/2002 | Luedeke | 451/57 |
| 6,875,090 B2 * | 4/2005 | Goulet et al. | 451/42 |
| 6,988,932 B2 * | 1/2006 | Ashjaee et al. | 451/5 |
| 7,066,794 B2 | 6/2006 | Granziera et al. | |
| 7,153,184 B2 | 12/2006 | Kuebler et al. | |
| 7,278,908 B2 | 10/2007 | Urban et al. | |
| 7,422,510 B2 | 9/2008 | Schneider et al. | |
| 8,167,682 B2 * | 5/2012 | Kim et al. | 451/11 |
| 8,246,424 B2 | 8/2012 | Philipps et al. | |
| 2002/0149862 A1 * | 10/2002 | Wallendorf et al. | 359/808 |
| 2008/0305723 A1 * | 12/2008 | Philipps et al. | 451/158 |
| 2010/0184361 A1 | 7/2010 | Schneider et al. | |

OTHER PUBLICATIONS

International Search Report, International Application No. PCT/EP2010/004898, Date of Mailing—Nov. 8, 2010, 2 pgs.

* cited by examiner

POLISHING TOOL FOR FINISHING OPTICALLY EFFECTIVE SURFACES ON SPECTACLE LENSES IN PARTICULAR

TECHNICAL FIELD

The invention relates to a polishing tool for finishing optically effective surfaces of, in particular, spectacle lenses, comprising a base or support body provided at the outer surface thereof with a processing section which can comprise an intermediate layer, which is softer by comparison with the base body and which rests on a polishing agent support.

PRIOR ART

Polishing tools of that kind are used particularly in production according to prescription of spectacle lenses in large batch numbers and are already state of the art in different forms of embodiment (see, for example, EP-A-1 473 116, DE-A-10 2005 010 583, EP-A-2 014 412). With automatic polishing devices either individual lenses or lens pairs are removed completely automatically from prescription boxes, polished, subjected to preliminary cleaning and thereafter deposited back in the prescription boxes. During the polishing process the flexible polishing tools adapt to the surface of the lens to be polished. Automatic polishing machines similarly belong to the state of the art (see, for example, DE-A-102 50 856, DE-A-10 2004 021 721). Tools with base bodies having different curvatures have to be allocated in respective correspondence with the curvature of the workpiece surface. The machines therefore have magazines for reception of these different tools.

In order to enable automatic tool change the so-termed interface between tool spindle and tool base body has to be constructed so that the tool can rest lightly on the spindle, center at the spindle and enter into a mechanically positive connection therewith which is as free of play as possible and which also allows transmission of higher levels of torque. Moreover, the polishing tool should be detented with the tool spindle so that it cannot fall down due to the influence of gravitational force. Interface solutions of that kind are already state of the art (see, for example, DE-A-102 50 856, DE-A-10 2004 062 319, DE-A-101 06 659).

The known solutions for the interface between tool spindle and base body of the polishing tool are not satisfactory, because they are exposed to a high degree of wear due to sprayed polishing agent. Polishing agent for spectacle lenses of plastic consists of an aqueous solution of fine-grained aluminum oxide, thus of an extremely hard and abrasive material. Due to the chemical and mechanical action of the polishing agent the interface is therefore exposed to an extreme level of wear during processing by polishing. The elements thereof serving for centering, detenting and torque transmission therefore wear out very quickly and no longer fulfill their function, which makes automatic tool change at least very difficult, if not impossible.

What is needed is a polishing tool for automatic tool change, the interface of which with the tool spindle is, with simple and economic construction, more functionally reliable and is not exposed to rapid wear under the action of the polishing agent.

SUMMARY OF THE INVENTION

According to the invention a polishing tool for finishing optically effective surfaces of, in particular, spectacle lenses, has a base body, at the outer side of which a processing section is provided and which has at its inner side an interior space. The interior space is bounded by a wall surface and a base surface and which is provided for pushing of the polishing tool onto and detenting with a mount of complementary construction of a tool spindle. The base surface has entrainer elements for transmission of torque, with which corresponding entrainer counter-elements at the mount are associated. A retaining ring is provided between the wall surface and the mount. The retaining ring is fixed in an annular groove and provides detenting with a corresponding counter-groove and sealing of the interior space, wherein the detenting arises during the pushing-on before the entrainer elements come into engagement with the entrainer counter-elements, which engagement is achievable only when further pushing-on is carried out under cancellation of the detenting and sealing between the wall surface and the mount.

In this regard, a significant element of the invention is the use of a retaining ring of simple construction and the double allocation of function thereto, specifically on the one hand as a detent element and on the other hand as a sealing element. By virtue of the arrangement in accordance with the invention the polishing agent used cannot penetrate through the gap between the wall surface of the interior space and the mount of the tool spindle to reach the entrainer elements and the entrainer counter-elements, so that wear caused by polishing agent cannot occur at that location.

Preferably, in a simple embodiment the entrainer elements arranged at the base surface of the interior space of the base body are formed by four block-shaped projections of corresponding dimensions and which with respect to a center axis of the base body are arranged at mutual angular spacings of 90° and at corresponding distances from the center axis.

In a further preferred form of embodiment the entrainer counter-elements arranged at the mount of the tool spindle are formed as four grooves which are provided in a planar end face of the mount and extend in radial direction and which with respect to a center axis of the mount are arranged in cross shape at mutual angular spacings of 90° and are intended for the purpose of each mechanically positively receiving a respective one of the four projections of the base body when the mount and base body are disposed in a corresponding relative rotational position with respect to one another and the base body is subject to an axial force canceling the detenting.

By virtue of this arrangement and construction of the entrainer elements and the entrainer counter-elements associated therewith in complementary manner the entrainer elements—after the entrainer elements have impinged on the end face of the mount with further pushing of the base body onto the mount and cancellation of the detenting—come into engagement with the entrainer counter-elements after at most a quarter, i.e. 90°, relative rotation.

In a further embodiment of the invention the annular groove provided for fixing the retaining ring is arranged in the wall surface of the interior space of the base body and is of greater depth than the counter-groove provided in the mount of the tool spindle so that the retaining ring protrudes inwardly to some extent from the wall surface of the interior space for sealing contact with the mount. In this way the retaining ring remains in the base body even after separation of the base body from the mount of the tool spindle and is available as a detenting element and sealing element for reuse of the polishing tool.

In an advantageous form of embodiment of the invention the base body is injection-molded from a thermoplastic plastics material. In this case, the entrainer elements can be formed integrally with the base body.

In a particularly economic embodiment the retaining ring is an O-ring, such as is readily available on the market. However, as an alternative thereto use can also be made of a retaining ring comprising an elastomeric base body with a substantially rectangular cross-section seated free of play under bias in the annular groove, which is substantially rectangular as seen in cross-section, whereby a higher level of security against unintended withdrawal of the retaining ring from the annular groove is given. In this regard, finally, the base body of the retaining ring can advantageously be provided at its inner circumferential surface with an encircling bead for engagement in the counter-groove and for sealing relative to the mount.

BRIEF DESCRIPTION OF THE DRAWINGS

The invention is described in more detail in the following by way of preferred embodiments with reference to the accompanying drawings, which are illustrated to increased scale by comparison with reality and in which.

DETAILED DESCRIPTION OF THE EMBODIMENTS

Figure 1:
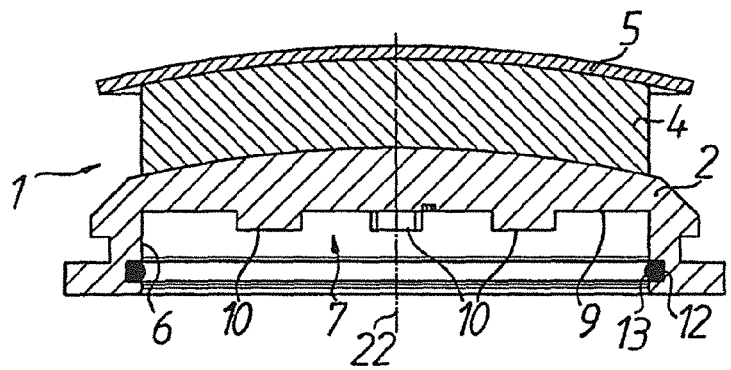
FIG. 1 shows a longitudinal sectional view of the polishing tool, which is still not connected with the tool spindle.

As apparent from the drawings, a flexible polishing tool 1 comprises a rotationally symmetrical base body 2 which can be mounted in a manner still to be described on the tool spindle 3 of a processing machine, the spindle being illustrated broken away in FIGS. 2, 3, 5 to 8 and 10. The polishing tool 1 serves for finishing of optically effective surfaces of, in particular, spectacle lenses (not illustrated). Provided at the outer side, i.e. the side remote from the tool spindle 3, of the base body 2 is a processing section which in the illustrated embodiment comprises an intermediate layer 4, which is fastened to the base body 2 and is softer in comparison with the base body 2, and a polishing agent support 5 resting on the intermediate layer 4. This construction of the polishing tool is sufficiently well known and therefore does not require further explanation here.

At its inner side, i.e. at its side facing the tool spindle 3, the base body 2 has an interior space 7 which is bounded by a cylindrical wall surface 6 and which is provided for the pushing-on of the polishing tool 1 and for detenting with a cylindrical mount 8 of complementary construction of the tool spindle 3. Entrainer elements 10, which are still to be described in more detail, are mounted on a base surface 9 of the interior space 7 for transmission of torque from the tool spindle 3 to the polishing tool 1. Entrainer counter-elements 11 provided at the cylindrical mount 8 and similarly still to be described in more detail are associated with the entrainer elements 10.

Provided between the wall surface 6 and the mount 8 is an elastomeric retaining ring 13, here in the form of an O-ring, which is fixed in an annular groove 12 and which is intended for detenting with a corresponding counter-groove 14 and sealing the interior space 7 against penetration of polishing agent. The detenting comes into being during pushing of the base body 2 by its interior space 7 onto the mount 8 of the tool spindle 3 as soon as the annular groove 12 and the counter-groove 14 are opposite one another (see FIGS. 6 and 7) and before the entrainer elements 10 come into engagement with the entrainer counter-elements 11. If the polishing tool 1 is then pushed further onto the mount 3, which takes place through polishing engagement of the polishing tool 1 with the spectacle lens (not shown) to be polished, the detenting is cancelled and the entrainer elements 10 enter into engagement with the entrainer counter-elements 11 as soon as transmission of torque from the driven tool spindle 3 to the polishing tool 1 takes place and the angular position of the entrainer elements 10 of the tool 1 after rotation through at most 90° corresponds with that of the complementary entrainer counter-elements 11, so that the polishing tool 1 is rotationally entrained (see FIG. 8). In all axial relative movements between tool 1 and spindle 3 the retaining ring 13 ensures sealing between the wall surface 6 and the cylindrical circumferential surface 15 of the mount 8.

Figure 2:
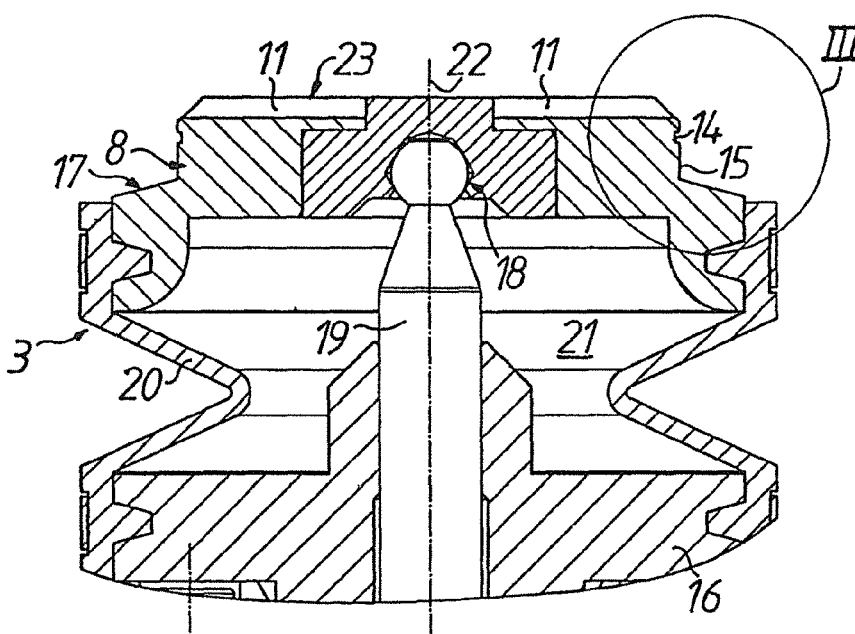
FIG. 2 shows a broken-away longitudinal sectional view of the tool spindle with the end thereof constructed for mounting of the polishing tool according to FIG. 1.
Figure 3:
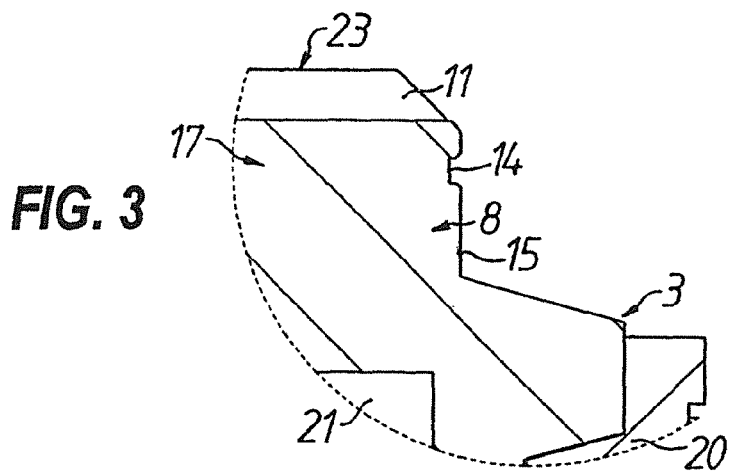
FIG. 3 shows the detail, which is illustrated to enlarged scale, in correspondence with the detail circle III in FIG. 2.

As evident from, for example FIG. 2 a base part 16 and a joint part 17 are provided at the tool spindle 3. The joint part 17 is guided to be tippable and longitudinally movable with respect to the base part 16 by means of a ball head connection 18 and a rod-shaped guide element 19 guided in the base part 16 to be axially displaceable. Connected with the joint part 17 in the direction of the base part 16 is a bellows 20 by which the joint part 17 is fastened to the base part 16 to be secure against relative rotation. The base part 16, joint part 17 and bellows 20 bound a pressure medium chamber 21 which by way of a channel (not shown) in the guide element 19 can be selectably loaded with a suitable liquid or gaseous pressure medium in order during processing of the optically effective surface at the spectacle lens (not illustrated) to exert a processing pressure by way of the joint part 17 on the polishing tool 1 resting thereon. Further details with respect to the construction of this arrangement can be inferred from the specifications DE-A-10 2005 010 583, EP-A-1 473 116 and EP-A-2 014 412 of the applicant, to which specifications express reference is made at this point and is hereby incorporated by reference for the avoidance of repetition.

Figure 4:
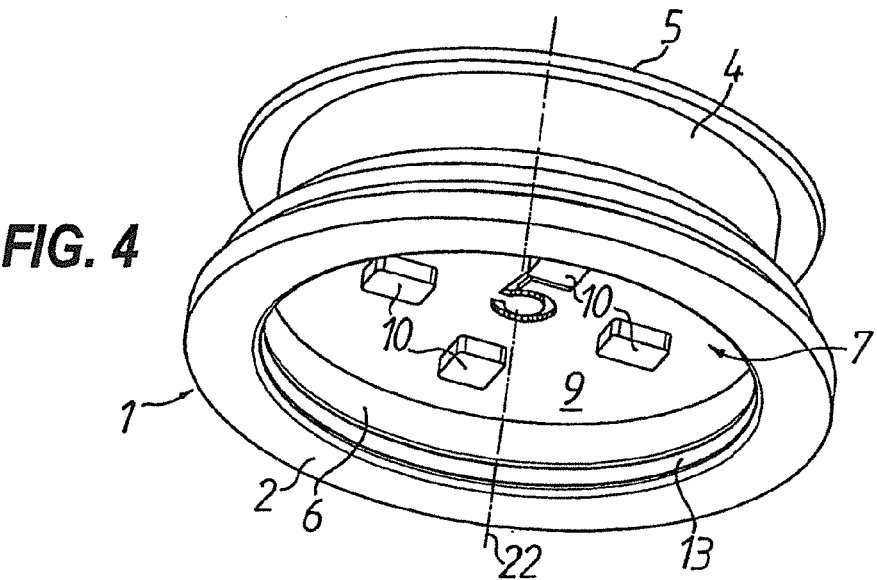
FIG. 4 shows the polishing tool corresponding with FIG. 1, in a perspective view on the side facing the tool spindle, for clarification of the tool side of the interface between tool and tool spindle.

Returning to the preferred construction of the interface between polishing tool 1 and tool spindle 3, it can be inferred particularly from FIG. 4 that the entrainer elements 10 arranged at the base surface 9 of the interior space 7 of the base body 2 are formed by four block-shaped projections corresponding in dimensions. The base body 2 with the projections is injection-molded from a suitable thermoplastic plastics material. With respect to the center axis 22 of the base body 2 the projections are arranged at mutual angular spacings of 90° and at corresponding distances (pitch circle radius) from the center axis 22. Different polishing tools can here have different pitch circle radii in order to index them for reception at specific locations of a tool magazine (not shown), wherein an annular groove with a corresponding pitch circle radius is provided at the respective location of the tool magazine.

Figure 5:
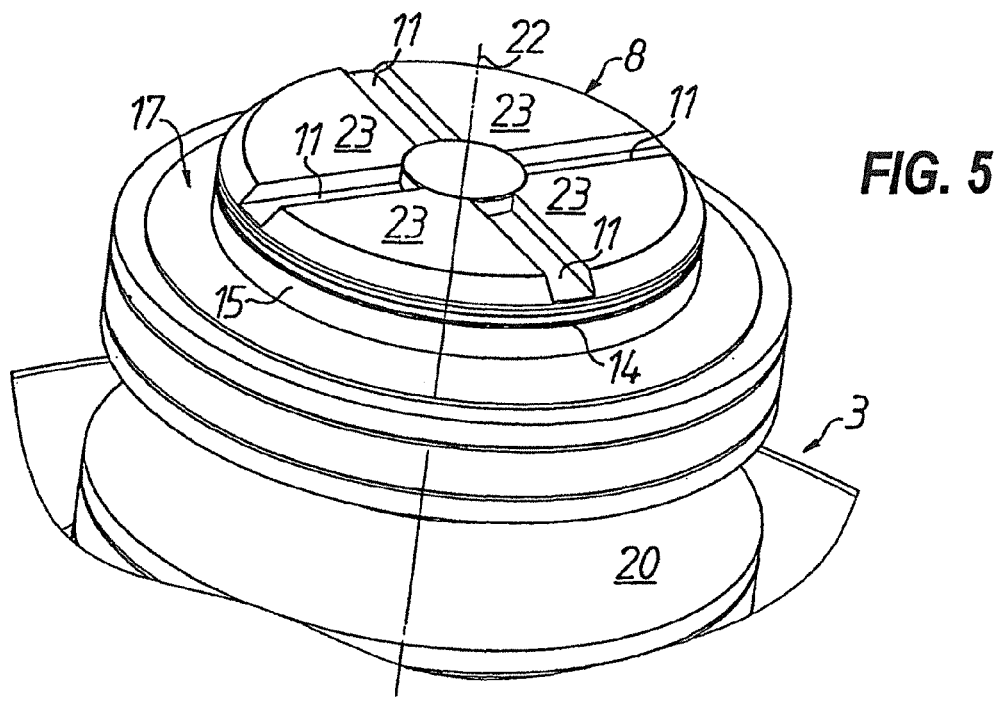
FIG. 5 shows the tool spindle corresponding with FIG. 2, in a perspective view on the side facing the tool, for clarification of the spindle side of the interface between tool and tool spindle.
Figure 6:
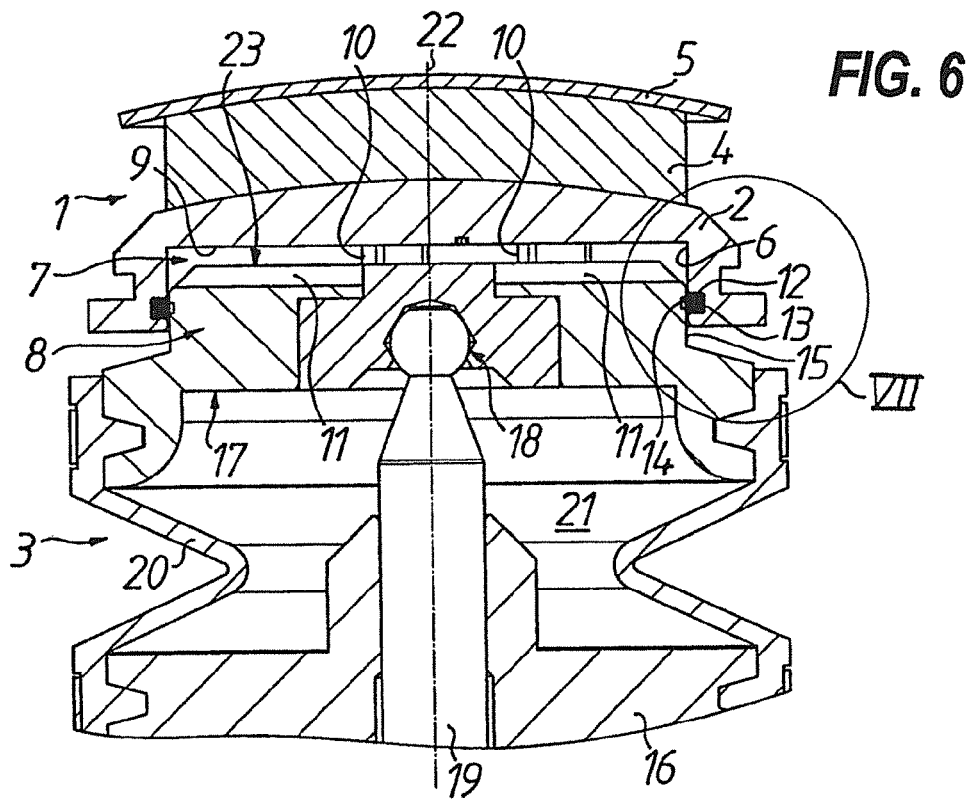
FIG. 6 shows a longitudinal sectional view of the polishing tool and the tool spindle, which is illustrated broken away, in the detent position of the tool with the spindle, in which the entrainer elements of the polishing tool are still not in engagement with the entrainer counter-elements of the tool spindle.

As evident from, in particular, FIG. 5 the entrainer elements 11 arranged at the cylindrical mount 8 of the tool spindle 3 are constructed as four grooves which are provided in a planar end face 23 of the mount 8 to extend in radial direction and the width of which is slightly larger than the width of the block-shaped projections forming the entrainer elements 10. These grooves are linear grooves which extend radially with respect to the center axis 22. The four grooves are arranged with respect to the center axis of the mount 8, which axis corresponds with the center axis 22 of the base body 2 and thus of the polishing tool 1, in cross shape with mutual angular spacings of 90°. The grooves are intended for the purpose of each mechanically positively receiving a respective one of the four projections of the base body 2 when the mount 8 and base body 2 are disposed in a corresponding relative rotational position with respect to one another and the base body 2 is subjected to an axial force canceling the detenting and to a torque.

Figure 7:
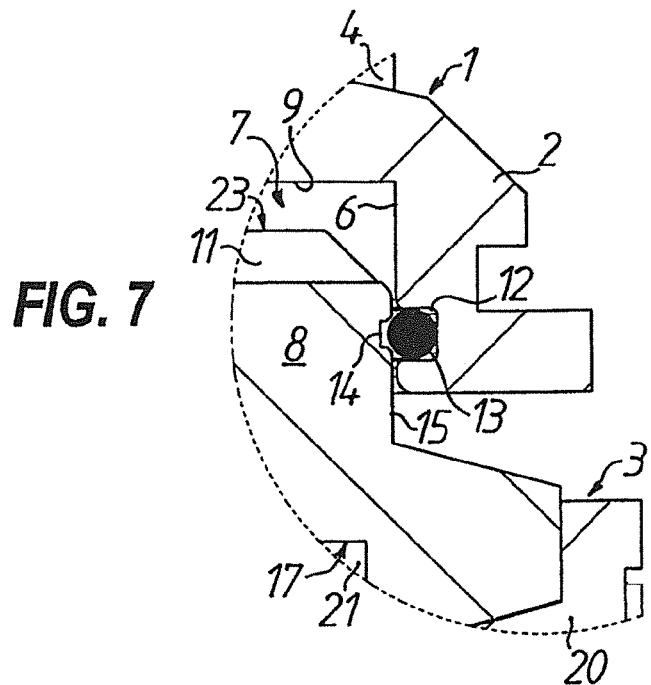
FIG. 7 shows the detail, illustrated to enlarged scale, in correspondence with the detail circle VII in FIG. 6.
Figure 10:
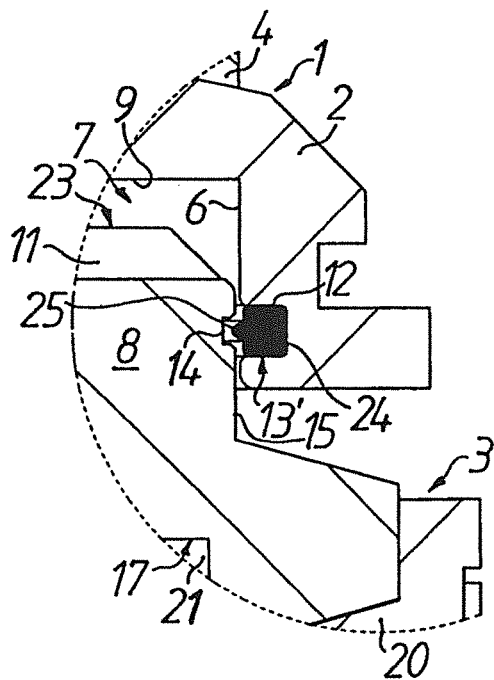
FIG. 10 shows a detail, which corresponds with FIG. 7, with the polishing tool variant according to FIG. 9.

As evident most clearly from FIGS. 7 and 10, the annular groove 12 provided for fixing the retaining ring 13 (or 13') is arranged in the wall surface 6 of the interior space 7 of the base body 2 and of greater depth than the counter-groove 14 provided in the cylindrical circumferential surface 15 of the mount 8 of the tool spindle 3. In that case the dimensions are so selected that the retaining ring 13 protrudes inwardly to some extent from the wall surface 6 of the interior space 7 for sealing contact with the cylindrical circumferential surface 15 of the mount 8. Since the annular groove 12 is of greater depth than the counter-groove 14, the retaining ring 13 inserted in the annular groove 12 remains in the annular groove 12 and thus at the polishing tool 1 even when the polishing tool 1 is removed from the mount 8.

Figure 8:
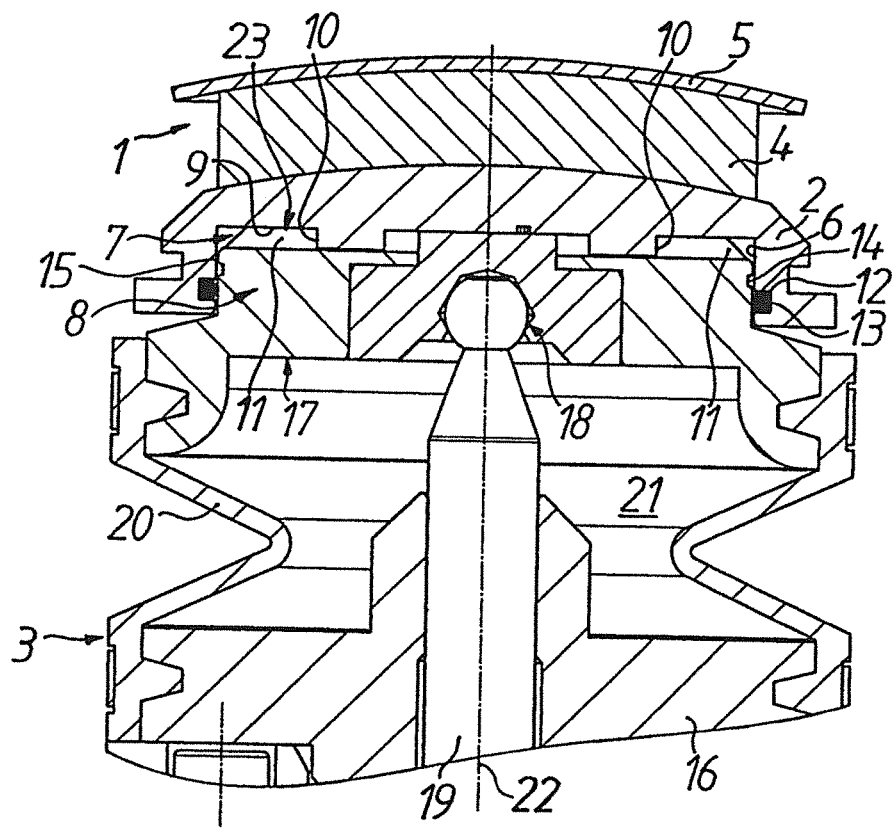
FIG. 8 shows a longitudinal sectional illustration of the polishing tool and the tool spindle, which is illustrated broken away, in the position of engagement of the tool with the spindle, in which the detenting is cancelled and the entrainer elements of the polishing tool are disposed in engagement with the entrainer counter-elements of the tool spindle.
Figure 9:
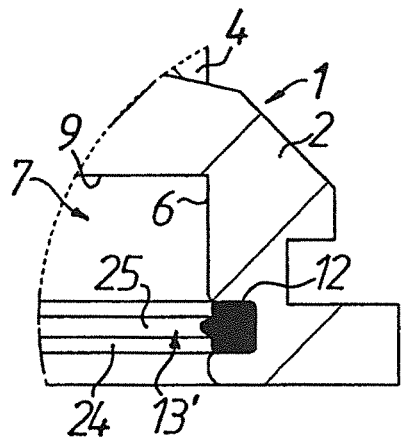
FIG. 9 shows a broken-away longitudinal sectional view, which is enlarged by comparison with the scale of FIG. 1, of the polishing tool, which is still not connected with the tool spindle, in a variant of the polishing tool shown in FIGS. 1, 4, 6, 7 and 8, in which a differently shaped retaining ring is used instead of an O-ring.

Whereas FIGS. 1, 4 and 6 to 8 show an O-ring as retaining ring 13, in the variant according to FIGS. 9 and 10 the retaining ring 13' has a different shape. More precisely, the retaining ring 13' comprises an elastomeric base body 24 with a substantially rectangular cross-section which is seated free of play and with bias in the annular groove 12, which is similarly substantially rectangular as seen in cross-section. The base body 24 of the retaining ring 13' is provided at its inner circumferential surface with an encircling bead 25, which is substantially semicircular as seen in cross-section, for engagement in the counter-groove 14 and for sealing relative to the mount 8. The dimensions of annular groove 12 and retaining ring 13' are in this case selected so that the base body 24 does not protrude out of the annular groove 12 beyond the wall surface 6 and radially inwardly into the interior space 7 of the polishing tool 1, but the bead 25 of the retaining ring 13' does indeed protrude and, in particular, to such an extent that in the relative setting of polishing tool 1 and mount 8 as shown in FIG. 8 it sealingly bears under bias against the cylindrical circumferential surface 15 of the mount 8.

The proposed polishing tool comprises a base body with a processing section on the outer side. At the inner side the base body has an open interior space by which the polishing tool can be pushed with sealing fit onto a mount of a tool spindle and, in particular, initially to a detent setting in which a retaining ring inserted in an annular groove of the interior space engages a counter-groove of the mount, whereby the polishing tool cannot unintentionally fall off the mount. The polishing tool is thereafter able to be pushed by the polishing working pressure further onto the mount under cancellation of the detenting until, with simultaneous action of a torque, entrainer elements of the base body engage entrainer counter-elements of the mount for the transmission of rotational movement. The retaining ring ensures at least in the latter relative setting between polishing tool and tool spindle a sealing against penetration of the abrasive polishing agent, so that the interface between polishing tool and tool spindle is, with a simple and economic construction, functionally reliable and low in wear.

Variations and modifications are possible without departing from the scope and spirit of the present invention as defined by the appended claims.

We claim:

1. A polishing tool for finishing optically effective surfaces of, in particular, spectacle lenses, comprising a base body, at the outer side of which a processing section is provided and which has at its inner side an interior space, which is bounded by a wall surface and a base surface and is for pushing of the base body onto and detenting and mounting with a mount of complementary construction of a tool spindle and has at its base surface entrainer elements for transmission of torque, with which corresponding entrainer counter-elements at the mount are associated, wherein provided between the wall surface and the mount is a retaining ring which is fixed in an axially positioned annular groove in one of the wall surface and mount and which provides detenting with a corresponding axially positioned counter-groove in the other of the wall surface and mount and sealing of the interior space, wherein the detenting arises during the pushing-on before the entrainer elements come into engagement with the entrainer counter-elements, which mounting engagement of the entrainer counter-elements for transmission of torque from the mount to the base body is achievable only when further pushing-on is carried out under cancellation of the detenting of said retaining ring in said annular groove and sealing occurs between the wall surface and the mount.

2. A polishing tool according to claim 1, wherein the entrainer elements arranged at the base surface of the interior space of the base body are formed by four block-shaped projections of corresponding dimensions which with respect to a center axis of the base body are arranged at mutual angular spacings of 90° and at corresponding distances from the center axis.

3. A polishing tool according to claim 2, wherein the entrainer counter-elements arranged at the mount of the tool spindle are constructed as four grooves which are provided in a planar end face of the mount and extend in a radial direction and which with respect to a center axis of the mount are arranged in cross shape with mutual angular spacings of 90° and are intended for the purpose of each mechanically positively receiving a respective one of the four projections of the base body when the mount and base body are disposed in a corresponding relative rotational position with respect to one another and the base body is subjected to an axial force canceling the detenting.

4. A polishing tool according to claim 3, wherein the annular groove provided for fixing the retaining ring is arranged in the wall surface of the interior space of the base body and is of greater depth than the counter-groove provided in the mount of the tool spindle so that the retaining ring protrudes inwardly to some extent from the wall surface of the interior space for sealing contact with the mount.

5. A polishing tool according to claim 4, wherein the base body is injection-molded from a thermoplastic plastics material.

6. A polishing tool according to claim 5, wherein the retaining ring is an O-ring.

7. A polishing tool according to claim 5, wherein the retaining ring comprises an elastomeric base body with a substantially rectangular cross-section which is seated free of play under bias in the annular groove, which is substantially rectangular as seen in cross-section.

8. A polishing tool according to claim 7, wherein the base body of the retaining ring is provided at its inner circumferential surface with an encircling bead for engagement in the counter-groove and for sealing relative to the mount.

9. A polishing tool according to claim 3, wherein the base body is injection-molded from a thermoplastic plastics material.

10. A polishing tool according to claim 9, wherein the retaining ring is an O-ring.

11. A polishing tool according to claim 9, wherein the retaining ring comprises an elastomeric base body with a substantially rectangular cross-section which is seated free of play under bias in the annular groove, which is substantially rectangular as seen in cross-section.

12. A polishing tool according to claim 11, wherein the base body of the retaining ring is provided at its inner circumferential surface with an encircling bead for engagement in the counter-groove and for sealing relative to the mount.

13. A polishing tool according to claim 2, wherein the annular groove provided for fixing the retaining ring is arranged in the wall surface of the interior space of the base body and is of greater depth than the counter-groove provided in the mount of the tool spindle so that the retaining ring protrudes inwardly to some extent from the wall surface of the interior space for sealing contact with the mount.

14. A polishing tool according to claim 13, wherein the base body is injection-molded from a thermoplastic plastics material.

15. A polishing tool according to claim 14, wherein the retaining ring is an O-ring.

16. A polishing tool according to claim 14, wherein the retaining ring comprises an elastomeric base body with a substantially rectangular cross-section which is seated free of play under bias in the annular groove, which is substantially rectangular as seen in cross-section.

17. A polishing tool according to claim 16, wherein the base body of the retaining ring is provided at its inner circumferential surface with an encircling bead for engagement in the counter-groove and for sealing relative to the mount.

18. A polishing tool according to claim 1, wherein the annular groove provided for fixing the retaining ring is arranged in the wall surface of the interior space of the base body and is of greater depth than the counter-groove provided in the mount of the tool spindle so that the retaining ring protrudes inwardly to some extent from the wall surface of the interior space for sealing contact with the mount.

19. A polishing tool according to claim 1, wherein the base body is injection-molded from a thermoplastic plastics material.

20. A polishing tool according to claim 1, wherein the retaining ring is an O-ring.

21. A polishing tool according to claim 1, wherein the retaining ring comprises an elastomeric base body with a substantially rectangular cross-section which is seated free of play under bias in the annular groove, which is substantially rectangular as seen in cross-section.

22. A polishing tool according to claim 21 wherein the base body of the retaining ring is provided at its inner circumferential surface with an encircling bead for engagement in the counter-groove and for sealing relative to the mount.

23. A polishing tool for finishing optical effective surfaces of a spectacle lens, said polishing tool comprising:
  a base body having an outer side for mounting a polishing section;
  said base body having a skirt section and a mounting section within said skirt section being rotationally and drivably engageable with a complementary mounting section of a tool spindle;
  said skirt section having a sealing section for being sealable against said tool spindle for sealing said respective mounting sections within an interior space defined in part by said skirt section;
  said skirt section extending away from said polishing section;
  said sealing section having an encircling groove at an inner periphery of said skirt section and engageable with a sealing gasket and an outer peripheral wall of said tool spindle; and
  said encircling groove being axially interposed between said mounting section and a distal end of said skirt section and being axially spaced from said mounting section such that said sealing gasket can engage with said encircling groove and a second groove in said outer peripheral wall of said tool spindle for providing a detenting non-driving position of said mounting section of said polishing tool with respect to said complementary mounting section of said tool spindle and having said polishing tool being axially pushable to a non-detented and sealed position on said tool spindle for engaging said respective mounting sections for being rotationally drivable by said spindle.

* * * * *